SELECTOR ACTIONS FOR MULTIPLE KEY DEVICES

Filed June 14, 1960

5 Sheets-Sheet 1

INVENTORS
Le Roy V. Oxley
Clarence M. Blythe
BY Shoemaker and Mattare
ATTORNEYS

March 27, 1962 LE ROY V. OXLEY ETAL 3,026,985

SELECTOR ACTIONS FOR MULTIPLE KEY DEVICES

Filed June 14, 1960 5 Sheets-Sheet 2

INVENTORS
Le Roy V. Oxley
Clarence M. Blythe

BY Shoemaker and Mattare

ATTORNEYS

SELECTOR ACTIONS FOR MULTIPLE KEY DEVICES

Filed June 14, 1960 5 Sheets-Sheet 3

INVENTORS
Le Roy V. Oxley
BY Clarence M. Blythe
Shoemaker & Mattare
ATTYS.

*INVENTORS*
Le Roy V. Oxley
*BY* Clarence M. Blythe
Shoemaker & Mattare
*ATTYS.*

SELECTOR ACTIONS FOR MULTIPLE KEY DEVICES

Filed June 14, 1960

5 Sheets-Sheet 5

INVENTORS
Le Roy V. Oxley
BY Clarence M. Blythe
Shoemaker & Mattare
ATTYS.

United States Patent Office 3,026,985
Patented Mar. 27, 1962

3,026,985

SELECTOR ACTIONS FOR MULTIPLE KEY DEVICES

Le Roy V. Oxley and Clarence M. Blythe, Hendersonville, N.C., assignors to Robotyper Corporation, Hendersonville, N.C., a corporation of Michigan Filed June 14, 1960, Ser. No. 35,924
22 Claims. (Cl. 197—20)

This invention relates to improvements in selector actions for multiple key devices whereby to effect the operation of such key devices, such as, for example, electric typewriters. The device however is applicable to use in connection with any multiple key device where a plurality of elements are adapted to be selectively moved through or by the control of a perforated record sheet.

The present invention more particularly is directed to improvements in mechanism of the character disclosed in the patent to Carlson et al., 2,220,075, wherein the disclosed mechanism is useful in connection with record controlled systems where the selector merely initiates subsequent operations performed by another mechanism, or other mechanisms. As an example, in the case of the present improved mechanism being employed in connection with typewriters, the selector merely effects an operation by means of which a given key is selected to be operated by an actuating device.

In the selector action of the patent referred to, there is employed mechanism wherein vacuum means functions to actuate finger members selectively through the medium of a perforated control sheet or ribbon. In this mechanism a number of elongate, parallel units are provided and in each of the units there are a number of individual pouch units. The number of pouch units in the entire mechanism corresponds to the number of keys or other devices to be operated. The individual pouch units embody diaphragms which are maintained by vacuum applied to both sides thereof, in a predetermined inoperative position and one diaphragm is operatively coupled with a key actuating finger and upon the admission of an atmospheric air impulse to a pouch unit through the vacuum in the unit on one side of the diaphragm opposite to that to which the key operating finger is attached, the vacuum applied to the opposite side of such diaphragm causes the latter to move in a direction to operate the finger and consequent the attached key or the key coupled therewith.

In this prior selector action, as hereinbefore stated, a number of pouch units are embodied in one elongate unit and a number of such elongate units are secured together in parallel relation in a solid block. Consequently the breaking down of a pouch unit in one of the elongate units, requiring repair, necessitates the complete removal of the elongate unit and either its being placed in discard for replacement by a complete new elongate unit, or such elongate unit must be disassembled and the diaphragm material for all of the pouch units replaced in order to repair a single pouch unit.

It is accordingly an object of the present invention to provide an improved selector action wherein the pouch units are individually constructed and assembled in a block in such a manner that the failure of any individual pouch unit does not necessitate the tearing down of the entire block or the destruction of a number of other units, but such individual units are so placed that they may be selectively removed for repair or replacement by a new unit.

In the selector action of the prior patent, the key actuating fingers associated with the pouch units are mounted for a swinging movement through the medium of a hinge formed of a flexible material such as leather or the like. It is accordingly a further object of the present invention to provide a new and novel mounting for the key actuating finger of each pouch unit which avoids the use of hinge material which may be subject to wear.

It is another object of the present invention to provide a pivot or hinge mounting for the pouch unit fingers embodying a loose coupling between an end of the finger and the pouch diaphragm carrying body, whereby the finger may be mounted in operative position on the body without the use of attaching elements.

In the prior patent selector action vacuum is applied to each of the elongate units through a channel formed in one of the two long parts of which such elongate unit is made up and it is accordingly a further object of the present invention to provide a novel means whereby the desired vacuum for all of the units on one side of a pouch diaphragm of each unit in a row is applied in a new and novel manner permitting any one of the pouch units to be disconnected from the vacuum line without disturbing the connections of the other pouch units with such line.

A still further object of the invention is to provide in a selector action of the character stated a multiplicity of individual mutually independent valve or pouch units in the form of flat quadrangular bodies with novel means for removably mounting or securing such bodies in rows within a block frame whereby any one of such bodies can be easily and quickly extracted from the group and replaced by a new one and whereby the extraction or withdrawal of a body from the group or the row in which it is located at the same time disconnects it from its vacuum line and the replacement when introduced into the group will be automatically coupled with the vacuum line in air tight connection with the latter.

A still further object of the present invention is to provide in an action of the character stated a vacuum line for each row of valve or pouch units, formed of plastic tubing and provided at proper intervals along its length with apertures by means of which a nipple of each of the pouch units may enter the aperture of the plastic tube to form an air tight connection therewith whereby to be placed under the influence of vacuum or subatmospheric pressure in the tube.

Another object of the present invention is to provide a selector action of the character stated which is designed to have universal application to the various types of electrically operated typewriters wherein there may be variations in the locations of the different operating keys.

Still another object of the invention is to provide a new and novel selector action which is designed to be mounted beneath the conventional supporting plate or base for an electrical typewriter and wherein a means is provided for making adjustments in the front portion of the frame of the action where such might be necessary to bring the ends of the pouch actuated rods into proper relation with type key actuating means.

According to the present improved selector action there is provided a frame carrying in the bottom portion thereof a plurality of spaced parallel bars in each of which are formed a number of openings. Each bar supports in edge-to-edge relation a longitudinal row of the individual valve or pouch units.

The individual pouch units are in the form of flat quadrangular blocks each of which blocks is in two sections and which sections have opposing recesses and between the sections is clamped a diaphragm which closes one of the recesses forming a pouch. The side wall of the other section has a central aperture of materially smaller diameter than the pouch formed by the diaphragm over the first mentioned recess and which aperture is covered by a smaller diaphragm to the outer side of which a key actuating finger is attached, one end of the finger being loosely coupled with the bottom of the block while the upper end of the finger is adapted for connection with a key operating rod.

The recesses on opposite sides of the larger pouch diaphragm form vacuum chambers and these chambers are, in the operation of the device, maintained under vacuum with means whereby the vacuum in the chamber remote from the smaller diaphragm may be destroyed by the admission of an atmospheric air impulse caused to take place by an aperture of a control sheet registering with an aperture in a sensing head.

This manner of operating the diaphragms is fully set forth in the patent hereinbefore referred to.

The individual blocks of the pouch units are maintained in place on their supporting bars by spaced resilient clip fingers secured to and extending upwardly from the support bars, the blocks being provided with edge ribs for engagement between pairs of the clip fingers whereby the blocks are firmly maintained in place but may be selectively extracted from the group without disturbing any of the others.

Each of the blocks carries a pair of short nipples which when the block is placed in position on its supporting bar, project through an opening in the bar and one of these nipples is in communication with the vacuum chamber lying between the diaphragms while the other nipple is in communication with the vacuum chamber on the opposite side of the central or larger diaphragm.

The lower part of the frame carries, along one side, a tube adapted to be connected with an evacuating means and extending from and communicating with this tube are a number of nipples to which are attached tubes, preferably of plastic, each of which is disposed longitudinally of and beneath a bar and each plastic tube is provided with an opening into which is tightly fitted the nipple of a pouch unit which communicates with the vacuum chamber lying between the diaphragms of that unit. The other nipple of each pouch unit is connected by a suitable tube with a sensing head in a manner similar to that illustrated in FIG. 8 of the patent hereinbefore referred to.

By means of this new and novel arrangement it will be apparent from the foregoing and from the hereinafter more specifically described structure that easy and quick replacement of any one of the valve or pouch units can be effected, if and when necessary, without disturbing any of the other units or without necessitating the destruction of diaphragm material or other parts associated with the other units and it will also be apparent that the novel means for setting up a coupling between the evacuated plastic tubing and the several units is such that a tight, leak-proof connection is formed.

The invention will be best understood from a consideration of the following detail description taken in connection with the accompanying drawings forming part of the specification, with the understanding, however, that the invention is not confined to a strict conformity with the showing of the drawings but may be changed or modified so long as such changes or modifications mark no material departure from the salient features of the invention as expressed in the appended claims.

In the drawings:

FIG. 1 is a view in top plan of the forward portion of a typewriter supporting base such as is shown in our pending application Serial No. 510,791, filed May 24, 1955, now Patent No. 2,967,600, showing secured thereto, and in top plan, the new selector action of the present invention and showing the actuator rods or wires for coupling the fingers of the individual pouch units with keys of key mechanism, not shown in this figure, to be actuated;

Figure 1:
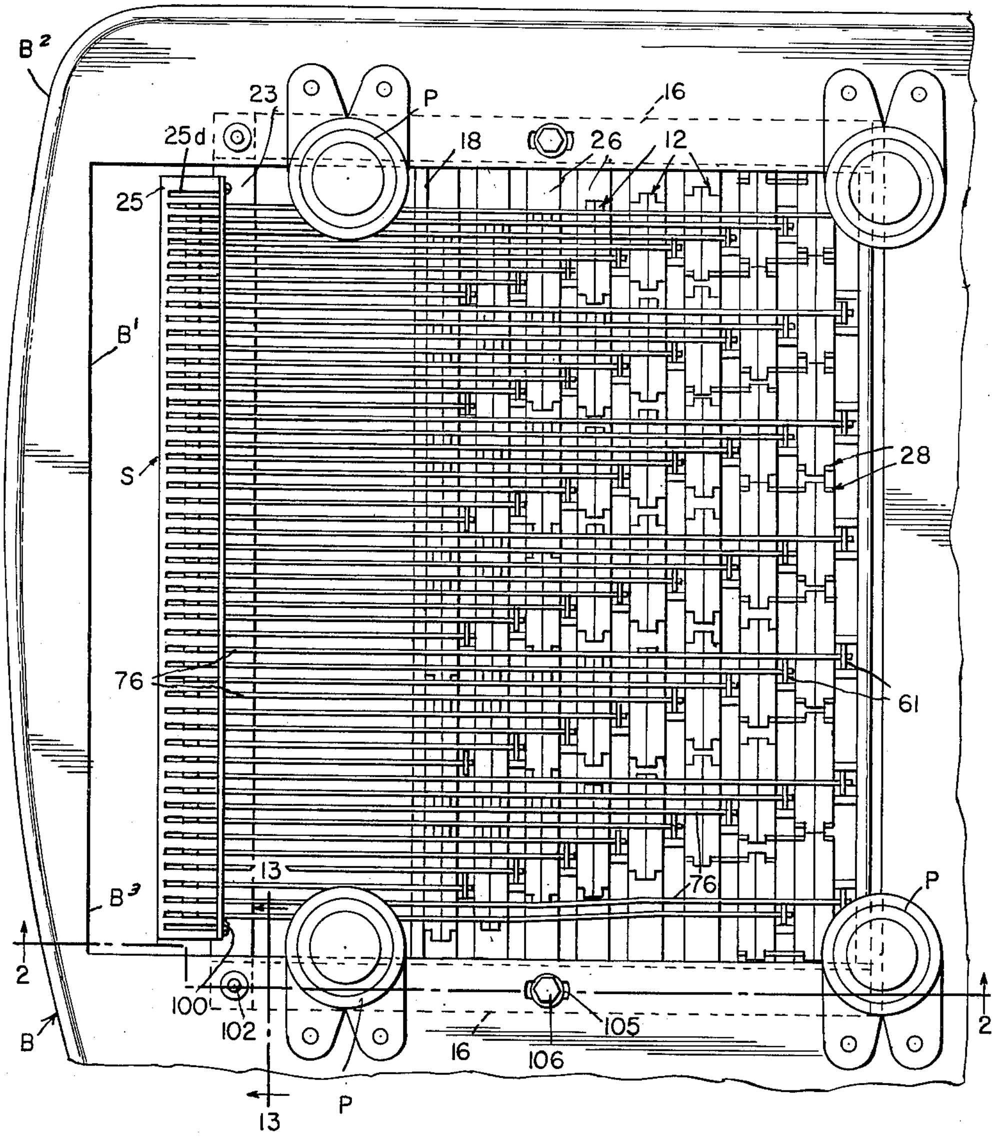
Figure 2:
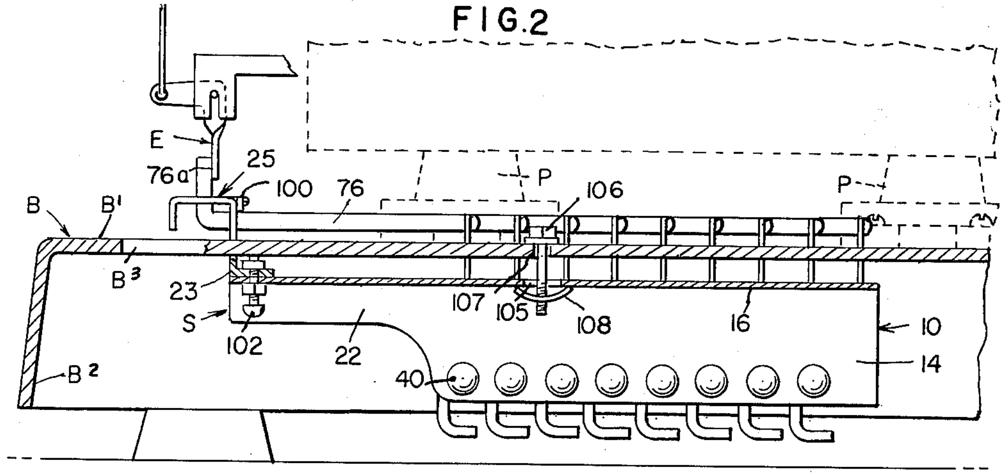
FIG. 2 is a sectional view taken substantially in the vertical plane of line 2—2 on FIG. 1, showing the selector action partly in side elevation and partly in section and showing a manner of attaching the action to the typewriter base and also showing the means for adjusting or leveling the action.
Figure 12:
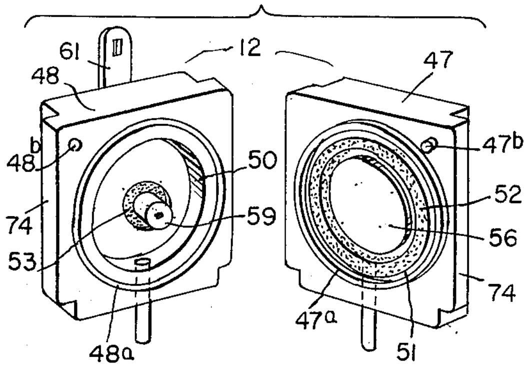
FIG. 12 is a view in perspective of a valve or pouch unit showing the halves thereof moved apart.
Figure 13:
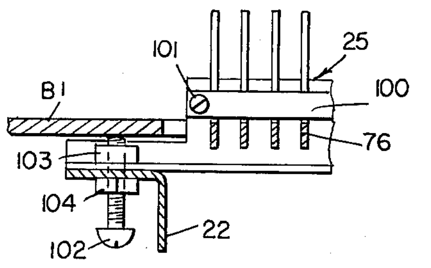
FIG. 13 is a sectional detail, on an enlarged scale, taken substantially on line 13—13 of FIG. 1.

Referring now more particularly to the drawings, in FIGS. 1 and 2 the reference character B generally designates the forward portion of a typewriter supporting base, such as is shown in our pending application hereinbefore referred to and upon the underside of which base the present improved selector action is mounted. This base comprises the flat top portion B1 and a flange portion B2 and the top portion B1 has formed therein the rectangular opening B3.

The reference characters P designate pads secured to the top portion of the base at opposite sides of the opening B3 upon which rest the feet of the typewriter, a portion of the bottom part of which is shown in broken lines in FIG. 2.

The improved selector mechanism which is attached to the underside of the top B1 of the typewriter supporting base is generally designated S.

The numeral 10 generally designates the frame of the selector action which supports a multiplicity of the diaphragm valve or pouch units.

Each of the pouch units supported in the frame is generally designated 12 and the units are assembled in rows across the width of the frame as shown, and supported in a manner hereinafter set forth.

The frame 10 comprises a pair of spaced side plates 14, the top edge of each of which is bordered by a wide outwardly extending flange 16.

The side plates 14 are tied together across the forward side of the frame by the top rail 18 while the opposite or rearward side of the frame has extending thereacross or is formed by a similar top rail 20 and a lower rail 21, which latter rails are connected at their ends to the side plates 14 to tie the latter together, thus forming the complete rectangular frame structure.

Figure 14:
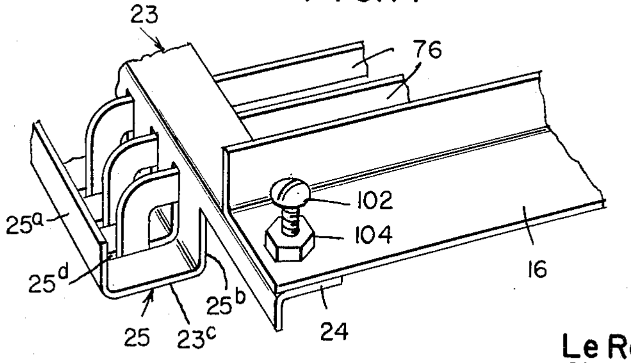
FIG. 14 is a perspective view of the underside of one corner of the selector action.

As best seen in FIG. 2 the side plates 14 at their forward ends are reduced in height to form the forwardly extending arms 22. These arms at their extreme forward ends support and are connected by the transverse actuator rod support and guide unit which is generally designated 23. This guide unit comprises the bar 24, the ends of which rest upon the top of the flanges 16 and the forward edge of this bar is formed integrally with the transversely slotted frame 25. This frame is generally in the form of a broad inverted U, comprising the forward and rear legs 25*a* and 25*b* and the relatively wide connecting web portion 25*c*. This web portion has formed transversely thereof the multiplicity of slots 25*d*, each of which extends downwardly into the rear leg 25*b* as best seen in FIG. 14.

Extending across the rear side of the leg 25*b* and covering the upper portions of the vertical ends of the slots 25*d* where they extend down into the leg 25*b* is an actuator bar retainer strip 100 which is secured at its ends by the screws 101 to the leg 25*b* of the guide.

The ends of the bar 24 are secured by welding or in any other suitable manner to the arms 22 and through each end of the bar 24 and the flange portion 16 on which it rests there is extended through a suitable opening an adjustment or leveling screw 102, the upper end of which is threaded into a nut 103 which is fixed to the bar 24. On the underside of the flange 16 the screw 102 carries the lock nut 104. The function of these adjusting or leveling screws will be hereinafter described.

Figures 3, 4:
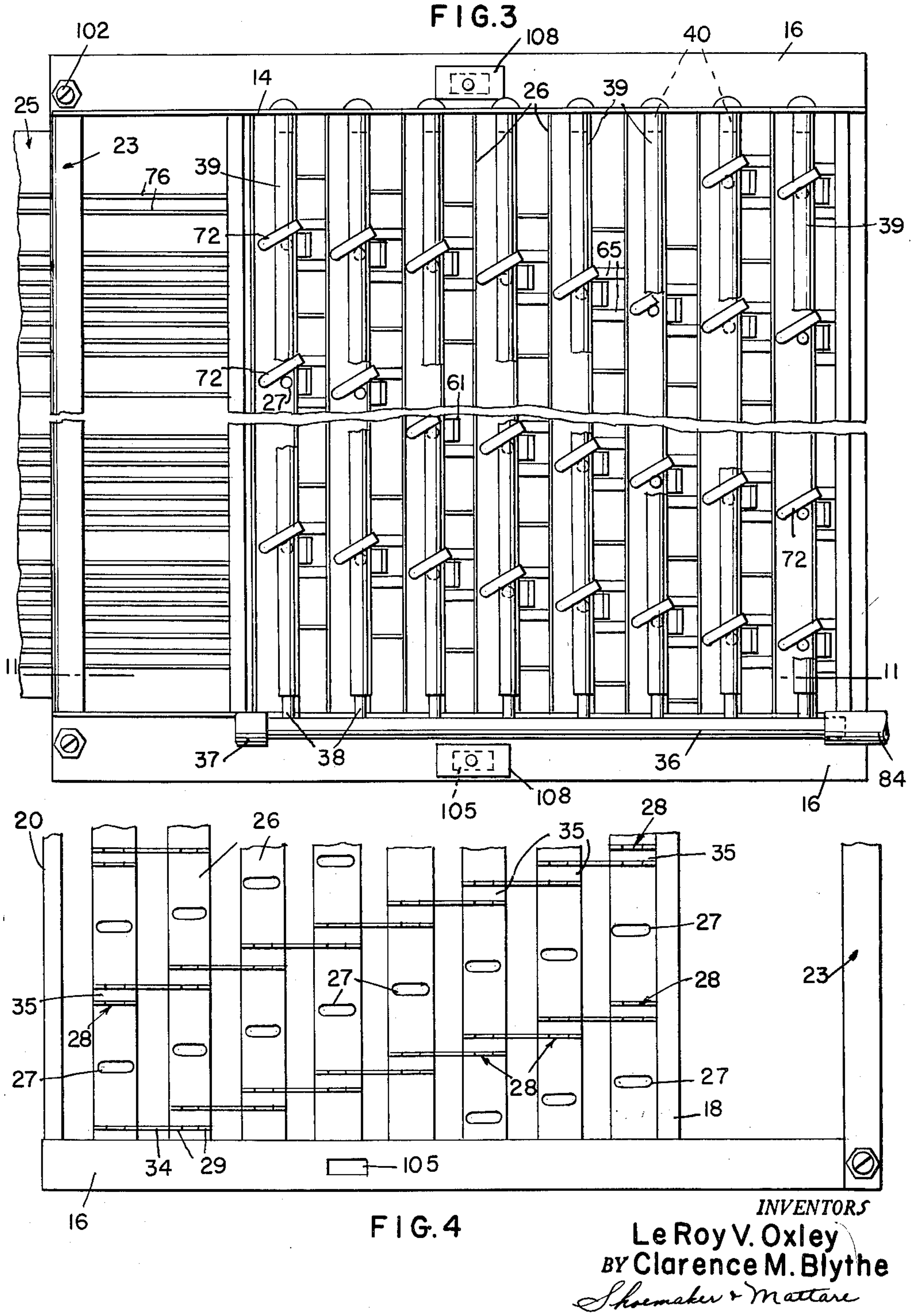
FIG. 3 is a bottom plan view of the selector action with a portion of the front broken away.
FIG. 4 is a top plan view of a portion of the frame with the pouch units removed therefrom.
Figure 5:
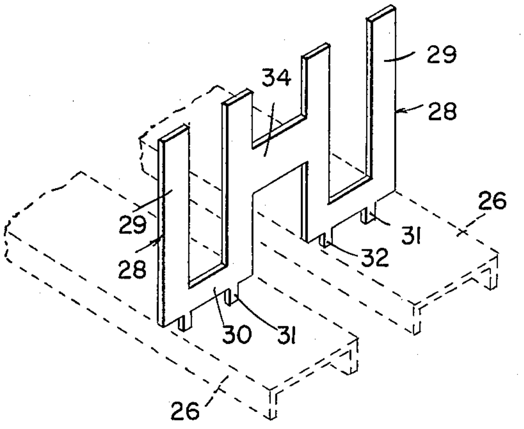
FIG. 5 is a view in perspective of a pair of tied together clip members, each of which clip members is adapted to slidably receive a side edge rib of a pouch unit.

Approximately midway of the ends of each of the flanges 16 there is formed a longitudinal slot 105, see FIGS. 2 and 3, for the reception of the mounting screw or bolt 106 by means of which the frame is attached to the underside of the typewriter base as shown particularly in FIG. 2. This figure illustrates the base as having an aperture therethrough at 107 for the mounting screw 106 and the screw passes downwardly through the underlying opening 105 of the frame base and has threaded upon its lower end the Tinnerman nut 108. As will be seen from FIG. 2 the upper end of the illustrated adjustment or leveling screw 102 is directed toward and is intended to bear against the underside of the top B1 of the typewriter supporting base and is will be understood, of course, that the corresponding adjusting screw on the other side of the frame also bears upon the underside of the base and by means of these screws desired pressure can be applied to the underside of the base to effect a slight flexing of the frame 10 so as to level the frame as may be necessary to bring the hereinafter described valve or pouch unit actuating rods into desired relationship with typewriter key actuating levers.

Extending across the width of the frame 10 between the side plates 14 are a number of spaced parallel pouch unit supporting bars 26. Each of these bars is here illustrated as being of channel form with the channel directed downwardly as shown in FIGS. 3, 5, 6 and 11. These bars 26 are each provided with a plurality of elliptical openings 27 corresponding to or in excess of the number of the pouch units to be supported on the bar and the openings 27 of one bar are offset toward one side of the frame with respect to the openings of the next succeeding bar and such openings of said next succeeding bar are in turn offset from those of the next succeeding bar so that the openings proceeding from the front to the rear of the frame are in staggered rows, as clearly shown in FIG. 4, for the purpose hereinafter described in connection with the description of the placement of the pouch units.

The bars 26 support a plurality of clip units which are in spaced relation longitudinally of the bars and arranged in pairs and adapted for securing one of the pouch units between each pair of clip units, in the manner about to be described. Midway between each pair of clip units is an opening 27 through which hereinafter described nipples carried by the pouch units project.

Each of the clip units is designated 28 and is in the form of a substantially U-shaped vertically disposed flat element embodying two thin vertical fingers 29 joined at the bottom by the straight cross member 30 and projecting downwardly from the bottom edge of this cross member are ears 31 which are extended through apertures 32 in the supporting bar 26 and the lower end portion of each ear which projects below the underside of the bar 26 is bent by twisting as indicated at 33, whereby to hold the bottom edge of the cross piece 30 securely against the top of the supporting bar.

Figure 6:
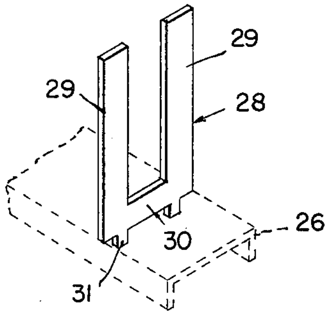
FIG. 6 is a view perspective of a single one of the clip members.

Certain of these clip units 28, which are cut, stamped or otherwise formed from thin sheet metal, are used singly in the form shown in FIG. 6 while in other instances the clip units, where one is in line with the other in the transverse direction of the supporting bar, are tied together by a cross connecting or tie portion 34, thus forming the two units into a set. These units 28, whether they are in sets or singles, are also arranged in staggered relation or offset in the direction of the width of the frame between the side plates 14 and in addition to being offset longitudinally of the bars or in the direction of the width of the frame, they are in spaced apart relation as shown in FIG. 4, the spaces between adjacent clips supported on the same bar being designated 35 and allowing for the interposing between the clips of parts of adjacent pouch units or the blocks making up such units, when each unit block is inserted between its respective pair of clips over the opening 27 between such pair.

Extending along one side of the frame adjacent to and below the bottom edge of a side plate 14 is a pipe or tube 36 which may be of metal or any other suitable material. This tube at one end is closed in a suitable manner as by the application thereto of the cap 37. The other end of the tube or pipe 36 is connected in the manner hereinafter stated with a conduit which in turn is coupled with an exhaust means whereby sub-atmospheric pressure can be maintained in the pipe 36. Any suitable means may be employed for securing the pipe or tube 36 in position.

The tube 36 carries a multiplicity of laterally projecting nipples 38 which are equal in number to the bars 26 and extend inwardly beneath the latter, and each of these nipples has connected therewith an end of a tube 39 of relatively heavy plastic. Each of the plastic tubes 39 extends throughout the length of the channeled under side of the adjacent bar 26 and the end of each tube 39 remote from the tube 36 is closed in a suitable manner as, for example, by a headed plug 40 extended through an opening in the adjacent plate and having the head thereof against the outer side of the plate. The plugs thus hold the ends of the tubes in position.

The outside diameter of the plastic tubes 39 is approximately half the length of the elliptical openings 27 which they cross and each of the plastic tubes 39, where it crosses an elliptical opening 27, has formed therein a hole 43 which is aligned with the adjacent end of the opening 27 for connection with a coupling nipple carried by a pouch unit.

FIGS. 7 to 10 and 12, illustrate in detail the construction of the individual pouch units. These units are all of exactly the same construction and, as shown, each of such units comprises a substantially rectangular flat block body 44 which is divided in a plane passing midway between the front and back walls 45 and 46 thereof into the two parts 47 and 48. These two parts 47 and 48 have formed in the confronting faces thereof the recesses 49 and 50 and interposed between the two block parts 47 and 48 and sealed around its periphery to the face of part 47 is a leather disc 51 which covers the recess 49 and forms a flexible or movable pouch diaphragm 52.

The back wall 46 has formed centrally therethrough an opening 53 of relatively small diameter as compared with the diameter of the pouch diaphragm 52, and secured to the outer face of this wall 46 is a sheet 54 of flexible material, such as leather or the like, which forms a small diaphragm 55 over the outer side of the opening 53.

The flexible pouch diaphragm 52 has fixed over that side thereof directed toward the wall 46, a disc 56 of relatively stiff material. The disc 56 is fixed at its center by a button 57 which is attached to the pouch diaphragm 52 in a suitable manner whereby the diaphragm is free to flex back and forth without interference from the disc 56. This disc 56 forms a thrust element in the manner hereinafter described.

The inner and outer surfaces of the small diameter diaphragm 55 have fixed thereto the aligned inner and outer buttons 58 and 59, respectively, by means of a pin 60 which passes longitudinally through the buttons and through the interposed diaphragm 55. This pin 60 also secures to the outer button 59 an actuating finger 61.

Figure 7:
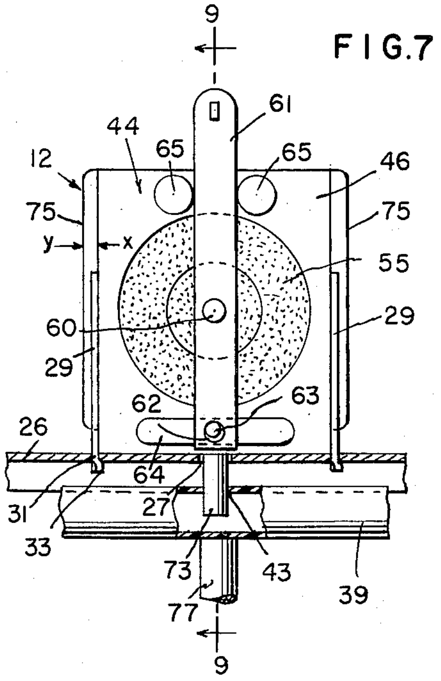
FIG. 7 is a view in elevation and on an enlarged scale, of the rear face of a single pouch unit, and showing the connection of a nipple with a plastic vacuum tube.

The finger 61 preferably is in the form of a long flat strip of metal or other suitable material and adjacent to one end, which is the bottom end of the finger when the pouch unit is set up for use, the finger has formed therethrough an aperture 62 in which is loosely received the rearwardly projecting pin 63 which is carried by a molded rib or similar formation 64 disposed across the bottom portion of the part 48, as shown most clearly in FIG. 7.

Figure 8:
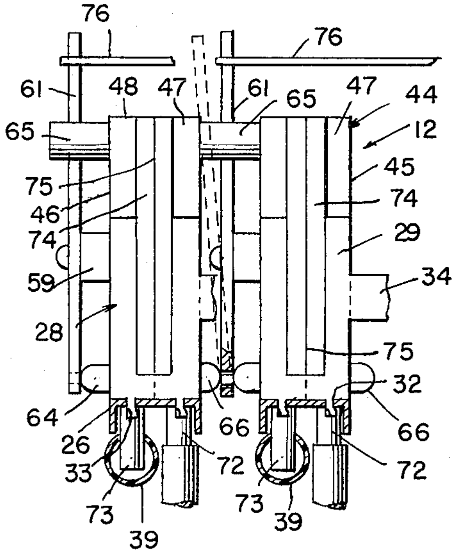
FIG. 8 is a view in side edge elevation and on an enlarged scale, of a pair of adjacent pouch units, and showing the spacing pins and the connections between the nipples of each of the units and the vacuum tube and atmospheric air impulse tube associated therewith.
Figure 9:
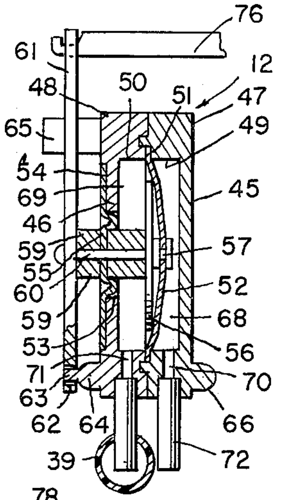
FIG. 9 is a sectional view taken substantially on the line 9—9 of FIG. 7 and illustrating the normal or inoperative position of the actuating finger and the diaphragms.
Figure 10:
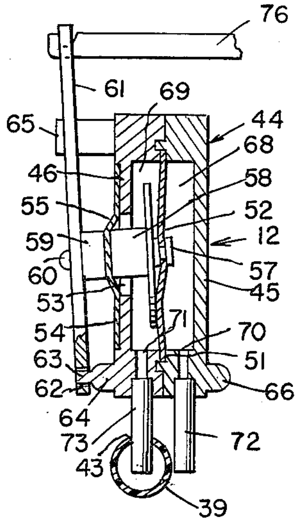
FIG. 10 is a sectional view corresponding to FIG. 9 but illustrating the actuating finger and diaphragms in operating position following the introduction of an atmospheric air impulse into the unit.

As is also shown in this figure, as well as FIGS. 8, 9 and 10, the pin 60 is secured to the finger 61 a substantial distance above the pin 63 and on the longitudinal center of the finger so that the finger, together with the buttons 58 and 59 and the diaphragm 55 are all coupled together to rock as a unit on the supporting pin 63, the aperture 62 being, of course, of sufficient dimensions to permit this motion.

The finger 61 is of a length to project an appreciable distance above the top of the block body 44 with which it is associated and in order to stabilize the back and forward rocking movement of the finger, the part 48 carries and has projecting rearwardly therefrom adjacent its top, the short guide pins 65 between which the upper end of the finger 61 is located and by which lateral motion of the finger is inhibited.

Figures 11, 15:
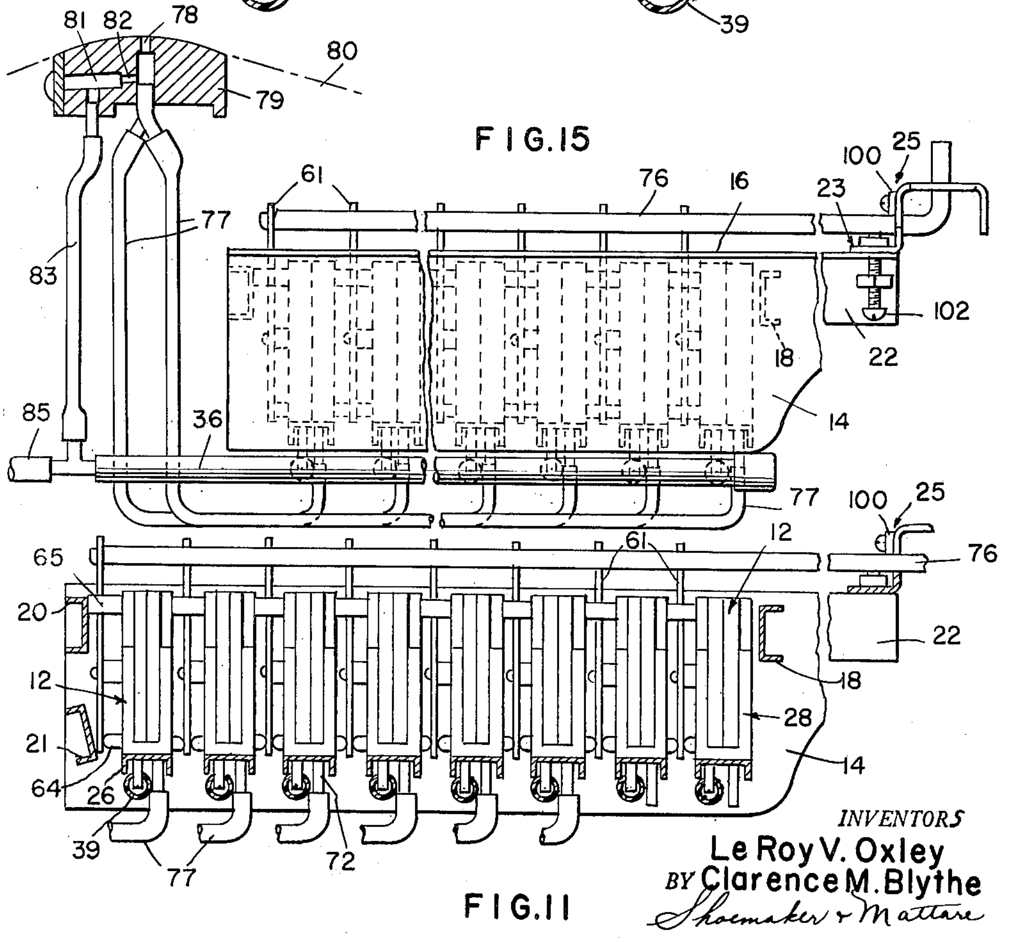
FIG. 11 is a section taken in the vertical plane of line 11—11 on FIG. 3, but with the pouch units in side edge elevation.
FIG. 15 is a somewhat more or less schematic side elevational view of the selector action with operative connections between the same and a sensing head by means of which the operation of a keyed mechanism such as a typewriter may be effected.

The two parts 47 and 48 of the block 44 are preferably formed of a moldable hard plastic and in addition to having the rib 64 and pins 65 molded integral with the part 58, the part 47 likewise has a rib molded across the lower portion thereof as indicated at 66 and, as will be seen on reference particularly to FIGS. 8 and 11, the ribs 64 and 66 together with the pins 65, cooperate as spacers between the blocks of pouch units of adjacent rows.

The two parts 47 and 48 of each pouch unit block are secured firmly together in a suitable manner as by the use of cement between the opposing faces whereby to establish the desired air tight seal between these confronting faces and the interposed diaphragm member 52. In addition a suitable sealing or adhesive composition is employed for joining the diaphragm sheet to the confronting faces.

To facilitate properly centering the parts 47 and 48, one upon the other, and also to assist in speeding up the work of joining the parts, one part, here shown as part 47, is molded with an annular rib **47*a* around the pouch pocket and the inner face of the other part is formed with an annular recess 48*a* to receive the rib. Also one inner face carries a projecting pin 47*b* which enters a hole 48*b*** in the inner face of the other part.

The construction described of the pouch unit, provides the two vacuum chambers 68 and 69 each of which has a port leading from the bottom thereof, which ports are designated respectively 70 and 71. Fixed in the bottom edge portions of the block parts 47 and 48 are nipples 72 and 73 which communicate respectively with the ports 70 and 71. These two nipples 72 and 73 extend through an elliptical opening 27 when the pouch unit is set in position upon a supporting bar 26 and the nipple leading into the chamber 69 is positioned to enter the hole 43 lying directly therebeneath and in the adjacent plastic tube 39, the diameters of the nipple and of the hole in which it enters being proportioned so that an air tight joint will be established.

The vertical side edges of the walls 45 and 46 of the two parts of each pouch unit block are formed with rib portions, or halves, 74 which terminate short of the bottom edges of the parts, and these rib portions 74 join, when the two parts are secured together, to form a full side edge rib 75, vertically of each side edge of the block body, as best seen in FIGS. 7 and 8.

The width of each full side edge rib 75 approximately equals the width of the space between the edges of the fingers 29 of a clip 28 and, as hereinbefore stated, each of the block bodies or each of the pouch units of which the block body 44 forms a part, is mounted in working position between a pair of clips 28 spaced longitudinally on a bar 26 on opposite sides of an opening 27 and in being so placed between the said pair of clip units, the inner edges of the fingers of each pair slidably receive the rib 75 between them, the bottom of the rib resting upon the cross piece 30 between the bottom ends of the fingers and the block body resting firmly upon the top of the underlying bar 26 as shown in FIGS. 7 and 8.

The height of the ribs 75, by which is meant the distance between the block wall surface at *x* and the outer surface of the rib at *y*, FIG. 7, is such as to equal approximately half the width of the space 35 between two adjacent clips 28, see FIG. 4, and, therefore, when a row of pouch units is set up on a supporting bar 26 they will be substantially in abutting side edge face relation. This makes for a substantial or firm assembly of the units in each row and the spacing ribs 64 and 66 cooperating, as illustrated in FIG. 8, together with the pins 65, make for a firm compact assembly of the units in the front to rear direction of the assembly.

Each of the actuator fingers 61 has connected therewith a motion transmitting rod 76 which extends forwardly through the portion of a guide aperture 25 in the guide lying in the leg **25*b* of frame 25, for engagement with a typewriter key operating element, as at E in FIG. 2, to be actuated by the selector action upon the movement of the finger 61 rearwardly as the result of the introduction of an atmospheric air impulse into the chamber 68 of the pouch unit with which the particular rod or wire 76 is connected. The rod 76 is here shown with an upturned end 76*a*** for engagement with the element E, but any other suitable connection may be employed.

It will be understood from the foregoing, upon reference to the prior patent hereinbefore referred to, that the action herein disclosed may be used in conjunction with mechanism such as that shown in the stated patent, or it may be used in connection with any other mechanism wherein it is desired to actuate keys or other movable parts by means of a perforated control strip or sheet moving across an apertured sensing head such as that illustrated in FIG. 15, or a sensing head such as that, for example, illustrated in pending application Serial No. 510,791. Also it will be understood that this selector mechanism may be connected through the medium of the rods 76 with key operating means such as that disclosed in the pending application of the foregoing serial number.

When the selector action is set up for operation, each of the nipples 72 is connected by an air impulse tube 77 to one of a series of openings 78 in a tracker bar or sensing head 79 over which a perforated paper record or perforated control sheet or strip 80 is moved, as will be readily understood by those familiar with pneumatic devices of this character. No illustration is here made of the spools for the record sheet as these are of well known construction. The tracker bar is provided with a longitudinally extending channel 81. A very minute bleed opening 82 connects each tracker bar opening or aperture 78 with the channel 81. The channel 81 is connected through a tube 83 with the tube 36 by means of a suitable coupling 84 leading to a suitable vacuum pump, not shown.

In the operation of the selector, when a reduced air pressure, or so-called suction, is induced in the tube 36, air is withdrawn from the spaces on both sides of the diaphragm 52, or in other words, from the chambers 68 and 69. This creates a tendency to draw the secondary or small diaphragm 55 toward the right, as viewed and illustrated in FIG. 9, thus holding the finger 61 in its normal position. Also, the tracker bar openings 78 being normally closed by the record sheet against the entrance of atmospheric air, a reduced air pressure or suction will be maintained in the chamber 68 behind the larger diaphragm 52 by the withdrawal of air from this chamber 68 through the tube 77 connected therewith through or by way of the bleed opening 82 in the tracker bar leading to the channel 81 and from the channel 81 through the tube 83 which is connected to the exhaust line 85. When the opening 78 of the tracker bar which communicates through the tube 77 leading to the chamber 68 is uncovered by the record sheet 80, or by an opening in the record sheet registering with the opening in the tracker bar, an impulse of air is momentarily admitted to the chamber 68 through the tube 77 connected therewith. Since there is a vacuum on one side of the diaphragm 52 while the impulse of air is admitted to the other side, the diaphragm 52 will be forced to the left as illustrated in FIG. 10. The disc 56 carried by the diaphragm 52 will strike the button 58 which is connected with the smaller diaphragm 55. Since the area of the diaphragm 52 is considerably greater than the area of the diaphragm 55, the diaphragm 52 will force the diaphragm 55 toward the left, thereby rocking the finger 61 a slight distance to the left as shown in FIG. 10, thereby causing the leftwardly moving upper end of the finger to impose a pull upon the rod or wire 76 attached thereto.

When the tracker bar opening has been closed by the control sheet, shutting off the impulse of air to the chamber 68, the atmospheric air which has been admitted to this chamber will be withdrawn by the suction or evacuating means through the bleed opening 82 and a vacuum or reduced air pressure will be restored in chamber 68. The smaller diaphragm 55 being exposed on the left or outer side to atmospheric air and to a vacuum or reduced air pressure on the opposite or inner side, will be flexed in the opposite direction to restore finger 61 to its normal position as illustrated in FIG. 9. Thus it will be seen that the movement of the finger 61 for each pouch unit from the normal to the selecting position is effected by the large or primary diaphragm 52 and that the return movement of the finger is effected by the secondary or effectually smaller diaphragm 55. This operation is made possible by the differential areas of the two diaphagms 52 and 55.

From the foregoing, it will be seen that the mounting for the fingers 61 is such that the use is avoided of any type of hinge material, such as leather or the like, or a hinge which must be attached to the finger and the block body of the unit by fastening elements. The coupling or hinge means embodying the use of the aperture 62 and the pin 63 permits the finger to be easily and quickly mounted in place and also this coupling is of a character which will withstand wear throughout a considerable period of time so that the pivot mounting will last indefinitely.

It will also be readily seen that in the selector action of the present invention any adjustments or repairs needed to be made to one pouch unit can be effected without disturbing any of the other units in the row in which the unit needing repair is located. Removal of any unit may be accomplished simply by detaching the actuating rod or wire 76 therefrom and disconnecting the tube 77 from the nipple 72 and then lifting or pulling the unit up from between the pair of clips between which it is positioned. This will automatically break the connection between the nipple 73 and the vacuum tube 39 located therebeneath.

Replacement of the unit involves, as will be obvious, the disposition of the same between the pair of clips, sliding the ribs 75 of the block bodies between the fingers 29 and upon the block body of the unit reaching the supporting bar on which it is to be carried, the nipple 73 thereof will re-enter the aperture in the underlying plastic vacuum tube. Following this, re-connection of the wire with the finger 61 and of the tube 77 with the other nipple of the unit is easily effected.

We claim:

1. In a pneumatic mechanism of the character described, a unit comprising a body having two contiguous chambers of substantially the same size divided by a diaphragm pouch adapted to move between the chambers under the action of fluid pressure differentials in the chambers, a second and smaller diaphragm forming a portion of a wall of one chamber and having an outer side exposed to the atmosphere, an elongate finger disposed diametrically across the outer side of said smaller diaphragm, a pivot between one end of said finger and said body on one radial side of the smaller diaphragm, said finger projecting at its other end a substantial distance beyond the opposite radial side of the smaller diaphragm, means coupling the finger with the smaller diaphragm for receiving a thrust from the first diaphragm upon movement of the latter against said means, and a pair of nipples each embedded at one end in the body and each communicating with one chamber.

2. The invention according to claim 1, wherein said pivot comprises a pin projecting from the body and loosely engaged in an aperture in the said one end of the finger.

3. The invention according to claim 1, in combination with support means comprising a pair of clips between which the body is frictionally held.

4. The invention according to claim 1, in combination with a support for the body and a pair of clips mounted upon said support and means for frictionally coupling the body with and between the pair of clips.

5. The invention according to claim 4, wherein each of said clips comprises a pair of spaced fingers and the means for frictionally mounting the body between the said clips comprises a rib formed across each of two opposite side edges of the body for slidable engagement between said fingers of the clips.

6. In a pneumatic mechanism of the character described, a unit comprising a body formed in two joined together sections, the said sections having opposing recesses of approximately the same size and a diaphragm between the two sections of the body covering the recesses and forming two vacuum chambers, the diaphragm forming a pouch adapted to move between the chambers under the action of fluid pressure differentials in the vacuum chambers, one of said body sections having a wall provided with an opening of materially smaller diameter than the chambers, a smaller diaphragm covering said opening and forming a part of the wall of one chamber and having an outer side exposed to the atmosphere, a thrust element secured to said smaller diaphragm and having an inner end portion in opposed relation with said diaphragm pouch and an outer portion extending outwardly from the smaller diaphragm, an elongate finger disposed diametrically across the outer side of the outer diaphragm and attached to the outer portion of said thrust element, a pivot coupling between one end of the finger and the adjacent part of the body comprising an aperture in said end of the finger and a pin member carried by said part of the body and loosely engaged in the aperture, the finger extending at its other end beyond the perimeter of the body opposite from said pin, each of the two sections of the body having a port leading from the perimeter of the body inwardly to the chamber recess of the respective body section, and a pair of nipples secured in the body and projecting from the last mentioned perimeter portion of the body and each nipple communicating with one of said ports.

7. The unit structure according to claim 6, wherein said body is of approximately rectangular contour and said sections thereof are formed with an outwardly projecting rib along two opposite faces, said pivot pin being an integral projecting part of one of said ribs, and a pair of guide pins projecting from the side of the body adjacent to the finger and spaced apart to receive the said other end portion of the finger therebetween.

8. In a selector action for pneumatically operated mechanisms, a frame comprising a pair of side members, front and back connectors between said side members, at least one support bar connected to and between said side members, a plurality of vacuum operated pouch units mounted in a row upon said support bar, each of said units embodying two vacuum chambers, plural means for coupling the vacuum chambers of said pouch units with fluid conducting tubes, and means carried by said support bar for detachably securing the pouch units to the bar, whereby any one unit may be removed and replaced without disturbing the other units.

9. The invention according to claim 8, wherein the said plural means comprises a pair of nipples carried by each unit and each communicating with a vacuum chamber of its respective unit.

10. The invention according to claim 8, with a fluid conducting tube extending throughout the length of said support bar, said tube being common to all of the units supported on the bar and connected by one of said plural means with one vacuum chamber of each unit.

11. The invention according to claim 8, wherein the last stated means comprises a series of cooperating pairs of clip units with each of said pouch units detachably held between a cooperating pair of clip units.

12. In a selector action for pneumatically operated mechanisms, a frame comprising a pair of side members, front and back connectors between said side members, at least one support bar connected to and between said side members, said bar having a series of openings therethrough and spaced longitudinally thereof, a plurality of vacuum operated pouch units mounted in a row upon said support bar, each of said units embodying two vacuum chambers, a pair of nipples carried by each pouch unit and each nipple opening into a vacuum chamber of its respective unit, each pair of nipples being extended through an opening in the support bar for connection with a fluid conducting tube, and means carried by said support bar for detachably securing the pouch units to the bar whereby any one unit may be removed and replaced without disturbing the other units.

13. The invention according to claim 12, with a single fluid conducting tube extending throughout the length of said supporting bar and having one nipple of each vacuum pouch unit connected therewith.

14. The invention according to claim 12, with a single fluid conducting elastic plastic tube extending throughout the length of said supporting bar beneath the openings in the bar and common to all of said vacuum pouch units thereon, said tube having a wall opening aligned with an adjacent bar opening and having one of the pair of nipples of an adjacent vacuum pouch unit extended therethrough, the plastic tube holes and nipple diameters being dimensioned so that an air tight connection will be established therebetween.

15. The invention according to claim 12, wherein the last stated means comprises a series of cooperating pairs of resilient clip units with each of said pouch units detachably held between a cooperating pair of clip units and each of said clip units embodying a pair of spaced fingers adapted to have a portion of the adjacent pouch unit located therebetween.

16. In a selector action for pneumatically operated mechanisms, a frame comprising a pair of side members, front and back connectors between said side members, at least one support bar connected to and between said side members, a plurality of flat rectangular vacuum operated pouch units mounted edge-to-edge in a row upon said support bar, each of said pouch units embodying two vacuum chambers, said bar having a series of openings therethrough and spaced apart longitudinally thereof, each vacuum pouch unit being positioned over one of said openings and including a pair of nipples extending downwardly through the underlying opening, each of the nipples of each unit being in communication with a vacuum chamber, a series of vertically disposed cooperating pairs of clip units mounted upon said support bar and having a pouch unit frictionally held therebetween for quick removal from and remounting upon the supporting bar, and a fluid conducting tube extending throughout the length of the underside of the supporting bar and having one nipple of each pouch unit detachably coupled therewith.

17. The invention according to claim 16, wherein said fluid conducting tube is of an elastic plastic with an opening in the wall thereof for the reception of the nipple with which it is connected, each opening in the plastic tube and the nipple connected therewith being proportioned whereby the nipple when inserted into the opening forms an air tight connection.

18. The invention according to claim 16, wherein each of said flat pouch units has a vertical rib along each of two opposite side edge faces thereof and wherein each clip unit of a cooperating pair embodies two relatively thin fingers having a side edge rib of the body of a pouch unit slidably positioned therebetween.

19. In a selector action for pneumatically operated mechanisms, a frame comprising a pair of side members, front and back connectors between said side members, at least two support bars connected to and extending between said side members and in parallel relation one with the other, a plurality of flat rectangular vacuum operated pouch units mounted edge-to-edge in a row upon and supported by each bar, each of said units embodying two vacuum chambers, plural means for coupling the vacuum chambers of said pouch units with fluid conducting tubes, and a series of cooperating pairs of clip units on and upstanding from each bar, each of said pouch units being detachably frictionally held between a cooperating pair of clip units, the clip units upon one bar being disposed relative to the clip units on the other bar whereby the vacuum pouch units upon one bar will be in offset staggered relation with the pouch units of the other bar.

20. The invention according to claim 19, with means connecting certain of the clip units of one bar with clip units upon the other bar whereby a bracing connection is formed between clip units of the two bars.

21. The invention according to claim 19, wherein each of said support bars has a series of openings therethrough and spaced longitudinally thereof, the said plural means of each pouch unit comprising a pair of nipples extending downwardly through an opening in the supporting bar and each nipple being in communication with a vacuum chamber in its respective pouch unit, a fluid conducting tube of elastic material extending throughout the length of and beneath each bar, each tube having a wall hole directed toward an opening in the overlying bar and having a nipple extending through that opening into the adjacent tube hole, the last mentioned nipple of each vacuum pouch unit being of a size to fit tightly into the hole of the elastic tube whereby to form an air tight slip coupling, and means for connecting said tubes with a source of vacuum.

22. The invention according to claim 21, wherein the said means for connecting the elastic tubes with a source of vacuum comprises a tube extending along one side of the frame and across an end of each of the elastic tubes, and a coupling between the said ends of the elastic tubes and the tube extending thereacross.

References Cited in the file of this patent

UNITED STATES PATENTS

| | | |
|---|---|---|
| 2,198,860 | Carlson | Apr. 30, 1940 |
| 2,894,614 | Lambert et al. | July 14, 1959 |